United States Patent
Ortiz et al.

(10) Patent No.: US 7,234,013 B2
(45) Date of Patent: Jun. 19, 2007

(54) SYSTEM AND METHOD FOR PREVENTING WAKE ON LAN TO PROTECT EXPANSION CARDS

(75) Inventors: Richard Ortiz, Roseville, CA (US); Roy Tsuchida, Campbell, CA (US); Walter William Alexander, III, Auburn, CA (US); Jerry Huang, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 10/698,900

(22) Filed: Oct. 31, 2003

(65) Prior Publication Data

US 2005/0097372 A1    May 5, 2005

(51) Int. Cl.
*G06F 13/00* (2006.01)
(52) U.S. Cl. .................. 710/302; 710/303; 713/300
(58) Field of Classification Search ............... None
See application file for complete search history.

(56) References Cited

U.S. PATENT DOCUMENTS

| | | | | |
|---|---|---|---|---|
| 5,151,992 A | * | 9/1992 | Nagae ................... | 713/300 |
| 5,862,393 A | * | 1/1999 | Davis .................... | 713/300 |
| 5,875,308 A | * | 2/1999 | Egan et al. ............. | 710/302 |
| 6,012,114 A | * | 1/2000 | Autor et al. ............ | 710/302 |
| 6,069,796 A | | 5/2000 | Hastings et al. | |
| 6,105,090 A | | 8/2000 | Fosmo | |
| 6,182,173 B1 | * | 1/2001 | Grosser et al. ......... | 710/302 |
| 6,232,676 B1 | * | 5/2001 | Kozyra et al. .......... | 307/113 |
| 6,634,898 B2 | * | 10/2003 | Clements ................ | 439/327 |
| 6,658,507 B1 | * | 12/2003 | Chan ..................... | 710/100 |
| 6,850,417 B2 | * | 2/2005 | Cooper et al. .......... | 361/752 |
| 6,950,952 B2 | * | 9/2005 | Felsman ................. | 713/310 |
| 2003/0022530 A1 | | 1/2003 | Clements | |
| 2003/0128527 A1 | * | 7/2003 | Chewning .............. | 361/747 |
| 2003/0167367 A1 | * | 9/2003 | Kaushik et al. ........ | 710/302 |
| 2003/0237007 A1 | * | 12/2003 | Ramirez ................. | 713/300 |
| 2004/0123009 A1 | * | 6/2004 | Holley et al. ........... | 710/302 |

FOREIGN PATENT DOCUMENTS

| | | |
|---|---|---|
| GB | 2385205 A | 8/2003 |
| JP | 02081284 A | 3/1990 |

* cited by examiner

*Primary Examiner*—Glenn A. Auve (57) ABSTRACT

Embodiments of the present invention include a method for providing protected swapping of a peripheral component in a computer system. The method comprises determining a position of a first mechanical retention latch wherein the first mechanical retention latch has an open position and a closed position and is configured to communicatively couple to a computer expansion card slot. Provided the first mechanical retention latch is in the open position, the method further includes filtering power management events and preventing the computer system from powering up. Provided the first mechanical retention latch is in the closed position, allowing the computer system to accept power management events.

18 Claims, 9 Drawing Sheets

SYSTEM AND METHOD FOR PREVENTING WAKE ON LAN TO PROTECT EXPANSION CARDS

TECHNICAL FIELD

Embodiments of the present invention relate to the field of power management for computer systems. More specifically, embodiments of the present invention relate to power management related to PCI devices.

BACKGROUND ART

As computer systems become more complicated and more powerful, and as power becomes more expensive to provide, it has become desirable in the computer industry to manage the power that the computer systems are using. For example, a server system or a raised floor data center can require large amounts of power to run and cool, even when the system is not fully utilized.

As a result, power management systems (e.g., a system utilizing power management events (PMEs) or power specifications) have been developed to allow computer systems to use power more efficiently. More specifically, power management systems allow the computer system to power up or power down depending on their usage. Such a computer system that utilizes a power management scheme uses less power to run and maintain because the system powers down when not in use.

Although power management events (PMEs) are beneficial for reducing power consumption of a computer system, PMEs can sometimes interfere with other features of the computer system. For example, many peripheral components are hot swappable. That is, a peripheral component (e.g., a PCI card) can be added or removed from the computer system without powering the computer system down. In so doing, the operating system of the computer system can be available to process requests from various sources at the same time the computer system is being repaired or upgraded.

To provide hot swappable capabilities in a computer system, the peripheral component interface (e.g., PCI slot) wherein the hot swap is occurring, must be powered down to avoid damage to the components being installed or removed from the peripheral component interface. If the peripheral component interface (e.g., PCI card slot) is not completely powered down, the peripheral component or the entire computer system could be damaged while upgrading or repairing the computer system. Special circuitry is typically used to power down a particular peripheral component interface when the peripheral component is not fully installed. Once the peripheral component is fully installed, the peripheral component interface is powered up and the newly installed peripheral component can be used. As a result of powering down the peripheral component interface, the computer system sees the peripheral component interface as asserted.

If the computer system is powered up and working, seeing an asserted peripheral component interface does not cause problems. However, if the computer system is turned off, there is a risk during the installation of a peripheral component that the computer system will determine that the peripheral component interconnect is asserted and will power up the computer system. If the computer system is powered up in the process of swapping a peripheral component, there is a risk of injuring the person swapping the peripheral component, and/or damaging the peripheral component or the entire computer system. For example, if the peripheral component is not fully installed in the peripheral component interface, and the computer system powers up from a false assertion, there is a risk of a short circuit.

Thus, there exists a need for a system and method for preventing false assertions associated with a peripheral component interface.

DISCLOSURE OF THE INVENTION

Embodiments of the present invention include a method for managing power in a computer system. Specifically, embodiments of the present invention determine a position of a mechanical retention latch having an open position and a closed position, wherein the mechanical retention latch is coupled to a computer peripheral component interface. Provided the mechanical retention latch is in the open position, embodiments of the present invention filter power management events and prevent the computer system from powering up from a sleep mode. Provided the mechanical retention latch is in the closed position, embodiments of the present invention allow the computer system to accept Power Management Events (PME) in sleep mode.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Reference will now be made in detail to embodiments of the present invention, a system and method for wake on LAN, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention provide a method for power management in a computer system. One type of power management event could be the Wake On LAN (WOL) feature that allows a user to remotely power up a computer system via a Local Area Network (LAN) card. In most cases, a computer system that utilizes the WOL feature has a LAN card coupled to a standby power supply. The LAN card that initiates the power on sequence could have partial power applied to it while the computer system is powered down (e.g., in a sleep mode). This partial power could inadvertently power up the computer system or create false power management events when, for example, installing an input/output card (e.g., PCI card) into a PCI card slot. Powering on a computer system while installing an input/output card could be hazardous to the card, the computer system or even the installer because the card could receive power before being fully installed.

Embodiments of the present invention implement a filter that filters power management event signals to avoid powering up a computer system from a sleep mode while installing or removing an expansion card. Provided a computer system powers up from a sleep mode while installing an expansion card, there is a possibility that the card or the computer system could be damaged, for example, by a short circuit. The present invention provides a system and method for safe installation and removal of an expansion card without the chance of the computer system powering up from a sleep mode thereby ensuring that the system, the card and the installer will not be damaged.

In one embodiment of the invention, a mechanical retention latch coupled to an expansion card slot is used to determine whether power management events should be filtered or not. In this embodiment, the mechanical retention latch has an open position and a closed position. A closed position indicates that no cards will be inserted or removed from the system. An open position indicates that a card is being installed or removed from the system. When the mechanical retention latch is in the open position, power management events are filtered to prevent the system from powering up. In other words, ignore power management events because there is a possibility that a PCI card is being installed or removed from the system. When the mechanical retention latch is in the closed position, power management events operate normally.

Figure 1A:
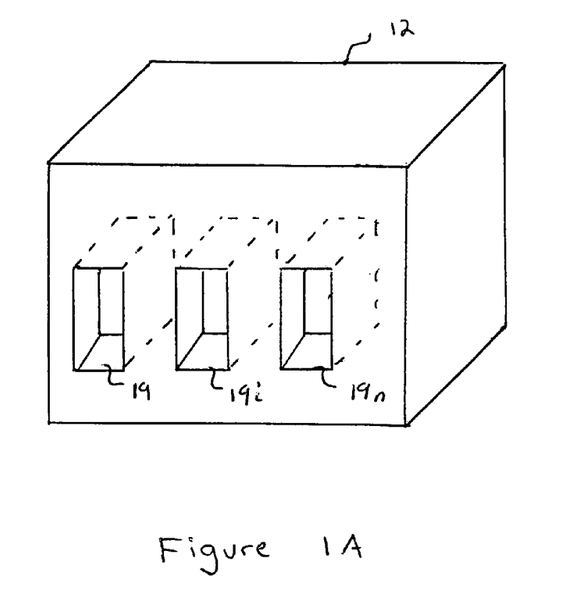
FIG. 1A is an illustration of an exemplary computer system with a plurality of expansion card slots in accordance with embodiments of the present invention.

FIG. 1A is an illustration of an exemplary computer system 12 comprising a plurality of PCI slots 19, 19i, and 19n in accordance with an embodiment of the present invention. In one embodiment of the invention, a PCI card is an open-architecture input/output expansion card. The PCI card could be for example, a storage card, sound card, video card, USB card, network interface card (NIC) or any other expansion card that adds a feature to the computer system 12. PCI slots 19, 19i, and 19n are configured to interconnect with a PCI card that can be inserted into the PCI card slot 19. In one embodiment of the present invention, the PCI card slot 19 comprises a mechanical retention latch (330 in FIG. 1C) that provides mechanical retention of a PCI card in the PCI card slot 19. In accordance with embodiments of the present invention, the PCI card slot 19 provides hot swappable capabilities. For example, a PCI card can be inserted or removed from the computer system 12 without powering down the entire computer system 12.

Figure 1B:
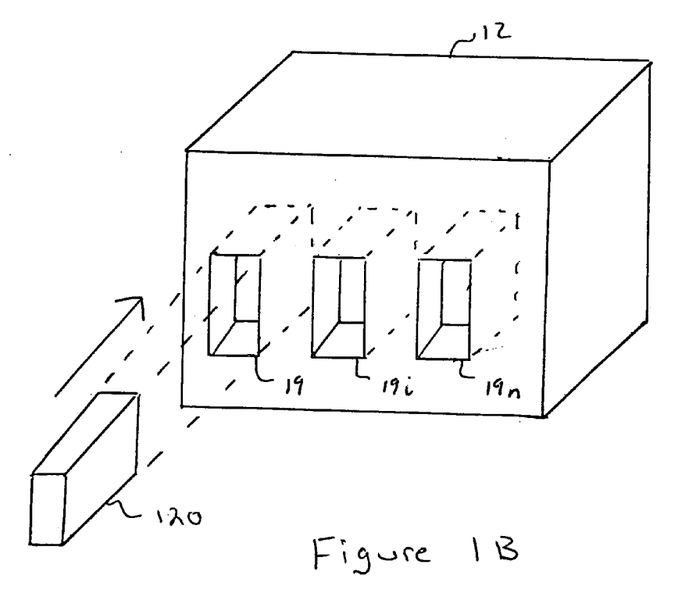
FIG. 1B is an illustration of an exemplary computer system during the installation of an expansion card in an expansion card slot in accordance with embodiments of the present invention.

FIG. 1B is an illustration of an expansion card 120 in the process of being inserted into an exemplary computer system 12 with a plurality of expansion card (e.g., PCI card) slots in accordance with embodiments of the present invention. PCI card 120 slides into the PCI card slot 19 where after the PCI card 120 is electrically coupled to computer system 12. In one embodiment of the invention, a power management events filter reduces the chance of damage to the PCI card 120 and computer system 12 by not allowing the computer system 12 to power up during the installation or removal of a PCI card from computer system 12. Embodiments of the present invention prevent a short circuit of the expansion card and/or the computer system by ensuring that the expansion card is not powered up until it is fully installed in the computer system. In one embodiment of the invention, a mechanical retention latch provides installation status information to a power management controller that prevents computer system 12 from powering up while the mechanical retention latch is in an open position. Once the latch is returned to the closed position, the system is free accept power management events.

Figure 1C:
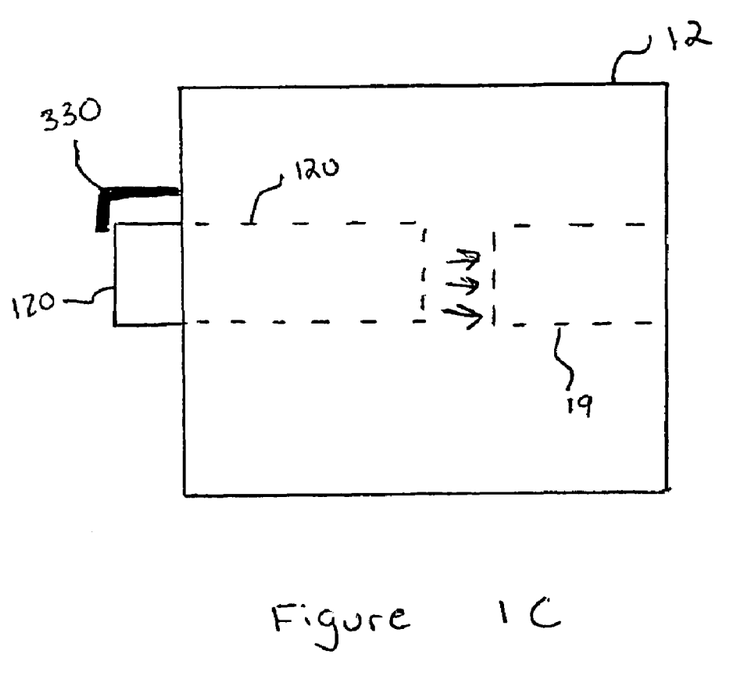
FIG. 1C is an illustration of an exemplary computer system comprising a mechanical retention latch configured to hold an expansion card in an expansion card slot in accordance with embodiments of the present invention.

For example, FIG. 1C is an illustration of an exemplary computer system 12 having a mechanical retention latch 330 in accordance with embodiments of the present invention. As stated above, mechanical retention latch 330 provides installation information (e.g., if the latch is open or closed) to a power management events filter that can control power in computer system 12. The latch can have an open and a closed position and can be configured so that it is not in the closed position unless a card is fully installed in the PCI slot or there isn't a card in the slot at all. When installing a card, such as PCI card 210, the mechanical retention latch 330 would be in the open position until the PCI card 210 is fully installed in the receiving slot (e.g., PCI card slot 19). A PCI card is vulnerable to installation problems, such as a short circuit, if the card slot is powered up before the card is fully installed in the slot. The mechanical retention latch of the present invention ensures that power management events will not power up the PCI card slot if in the open position (e.g., a card is not fully installed).

Figure 2:
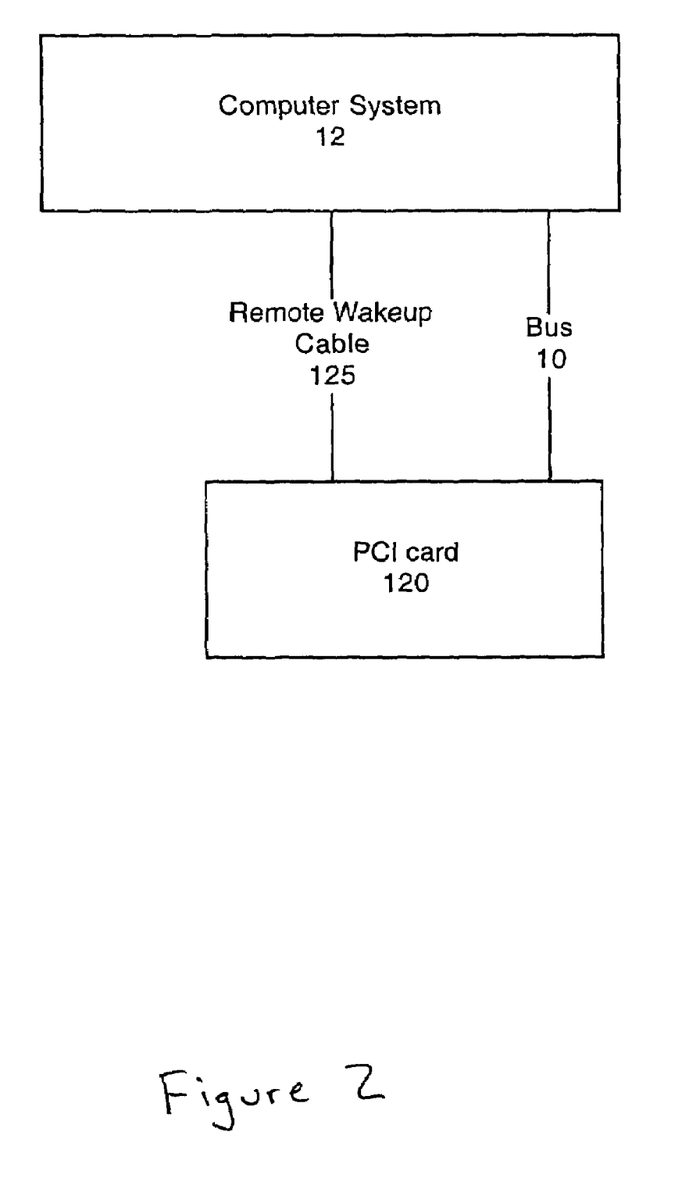
FIG. 2 is a block diagram of an exemplary computer system and a PCI card with remote wakeup capabilities in accordance with embodiments of the present invention.

FIG. 2 is a block diagram showing PCI card 120 (with remote wakeup capability) coupled to computer system 12 in accordance with embodiments of the present invention. PCI card 120 is coupled to computer system 12 via bus 10. In one embodiment of the present invention, PCI card 120 is also coupled to computer system 12 via remote wakeup cable 125. Typically, when a PCI card is installed in a PCI card slot, a power management event signal is generated and the computer system is powered up. By filtering power management events the present invention can prevent false assertions during the installation of PCI cards, thus reducing the chances of damage to the PCI card, the computer system is being installed in or the person installing the card. By filtering power management events, the present invention does not provide power to an expansion card until it is fully installed in the system with the latch closed.

In accordance with embodiments of the present invention, bus 10 provides a positive voltage to PCI card 120, in this discussion herein; this power is referred to as "primary power." The primary power is used to power PCI card 120 when, for example, computer system 12 is powered on and not in sleep mode, or when remote wakeup cable 125 is not attached.

When the remote wakeup function is present, a positive voltage is also provided to the PCI card 120 using the remote wakeup cable 125; in the discussion herein, this power is referred to as "first auxiliary power." The first auxiliary power is used to power PCI card 120 when it is available. In other words, the first auxiliary power supercedes the primary power and continues to be available when computer system 12 is in sleep mode. In this manner, power remains available to PCI card 120 so that it has the capability to wake up upon receiving a particular signal (e.g., a magic packet specified by a WOL protocol). In accordance with embodiments of the invention, while a mechanical retention latch is in the open position, power management events, including magic packets, are ignored because there is a possibility that a PCI card is being installed or removed. By filtering these power management events, the present invention ensures that a computer system will not be powered up from a sleep mode, during the installation or removal of a PCI card.

Additional auxiliary power of 3.3 volts can also be provided to PCI card 120 via bus 10. For example, revision 2.2 of the PCI specification requires that +3.3V of auxiliary power be provided via pin A14 of bus 10. In the discussion herein, this is referred to as "second auxiliary power." The +3.3V auxiliary power is not used if the auxiliary power provided by the remote wakeup cable 125 is powered down without auxiliary power.

As stated above, in one embodiment of the present invention, computer system 12 comprises a power management controller that controls power to PCI card 120. In one embodiment of the invention, when a PCI card is not fully installed in a PCI card slot (or the mechanical retention latch is in the open position), the power management events filter supercedes the wake-up capabilities (e.g., power management events) of the PCI card slot to prevent powering up a device that is not fully installed in a PCI slot. In particular, in one embodiment of the invention, a sensor is coupled to a mechanical retention latch that provides installation information (e.g., whether the latch is open or closed) to a power management events filter that filters power management events (e.g., powering up the system from a sleep mode) when the latch is open.

Figure 3:
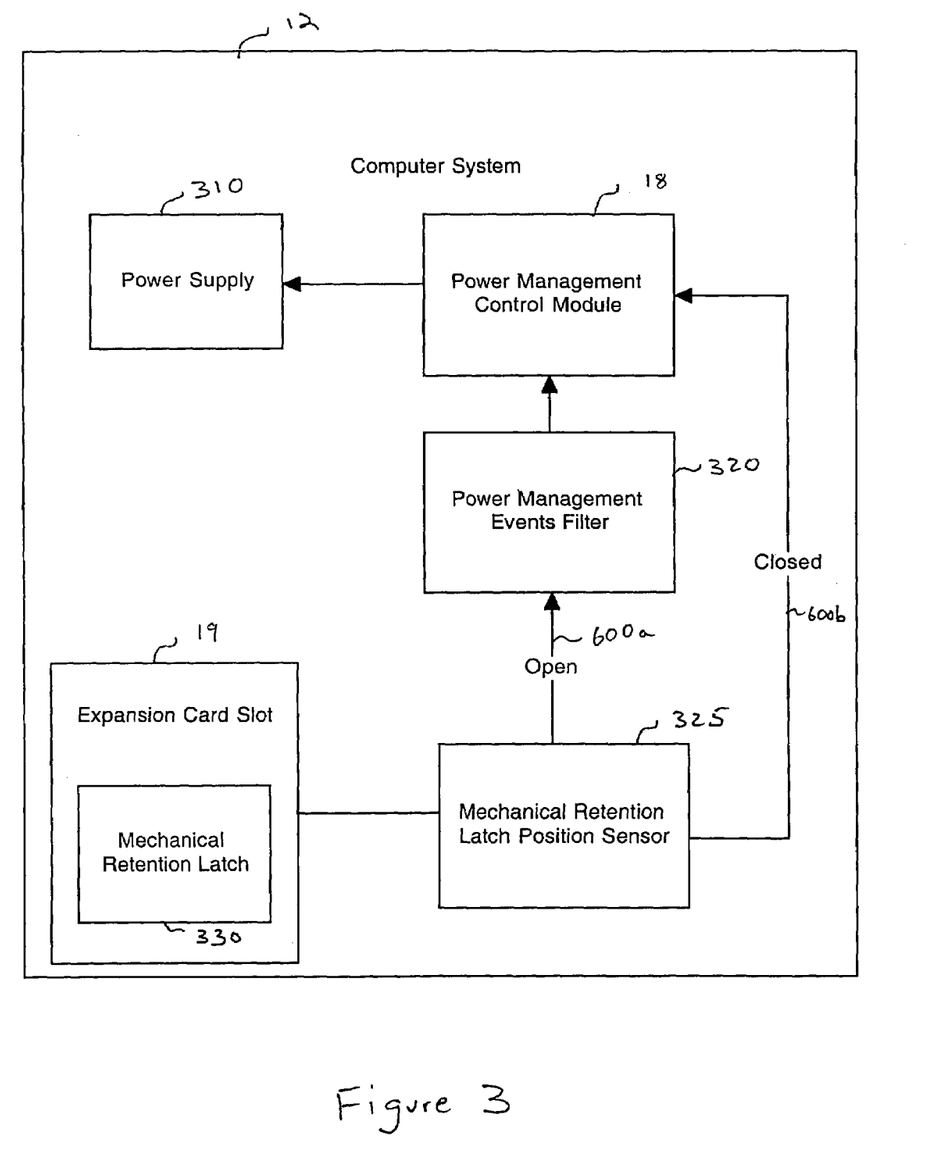
FIG. 3 is a block diagram of an exemplary system for managing power in a computer system in accordance with embodiments of the present invention.

FIG. 3 is a block diagram of an exemplary computer system with power management capabilities in accordance with embodiments of the present invention. Computer system 12 comprises a power management control module 18 for identifying power management events and controlling power distribution for computer system 12. As stated above, one example of a power management event is an event that allows computer system 12 to go into a sleep mode to conserve power when not in use and to wake when it receives the appropriate power management event (e.g., receiving a magic packet). The power management control module filters power management events when there is a chance that an expansion card is being installed or removed from computer system 12. For example, when a mechanical retention latch of an expansion card slot is in the open position. The power management control module communicates with and controls power supply 310. The power supply 310 provides power to the various components of computer system 12, such as expansion card slot 19.

In one embodiment of the invention, expansion card slot 19 has hot swappable capabilities (e.g., allows a card to be installed or removed from computer system 12 while it is powered up). Expansion card slot 19 comprises an exemplary mechanical retention latch 330 for physically retaining an expansion card in expansion card slot 19. In one embodiment of the invention the mechanical retention latch 330 comprises a sensor that reports data corresponding to the position of the latch. In this embodiment, the sensor can report data indicating an open position 600a and a closed position 600b. In one embodiment of the invention the mechanical retention latch is configured to automatically close when a card is installed in expansion card slot 19. In this embodiment, the mechanical retention latch automatically moves from the open position 600a to the closed position 600b when a card is fully installed. It is appreciated that the mechanical retention latch 330 is in the closed position 600b when a card is not installed in the expansion card slot 330. To begin the installation process, the mechanical retention latch 330 is opened from the closed position and then the PCI card can be inserted into the PCI card slot. To complete the installation, the PCI card is fully inserted in the slot and the mechanical retention latch automatically closes. It is also appreciated that the mechanical retention latch 330 can be configured to be manually opened or closed.

When the expansion card is physically installed in the expansion card slot 19 or the mechanical retention latch 330 is in a closed position, the mechanical retention latch position sensor 325 bypasses the power management events filter and reports the closed position 600b to the power control module. When the mechanical retention latch 330 is in the closed position 600b, the power management control module 18 functions normally and does not filter power management events (e.g., allows wake on LAN capabilities). When the mechanical retention latch 330 is in the open position 600a, the mechanical retention latch position sensor 325 reports an open position 600a to the power management events filter 320, which filters power management events destined for the power management control module 18. This prevents the computer system 12 from powering up during the installation or removal of an expansion card from expansion card slot 19, thus reducing the chances of damage to the computer system and/or the person performing work on the computer system 12. For example, if the mechanical retention latch is in the open position and computer system 12 receives a magic packet instructing it to power up, the power management events filter would filter the wake-up instructions until the latch is returned to the closed position. Filtering power management events prevents possible damage to hardware being installed or removed from the computer system by waiting until components are fully installed or removed before allowing the system to accept power management events including powering up from a sleep mode.

Furthermore, if computer system 12 is in sleep mode and a card is being installed in the expansion card slot 330, the mechanical retention latch 330 would be in the open position. The mechanical retention latch position sensor 325 reports data corresponding to an open position of the latch to the power management events filter 320 which filters the power management events and prevents the power control module 18 from powering up computer system 12. In one embodiment of the present invention, the power management events filter 320 is performed in software.

Figure 4:
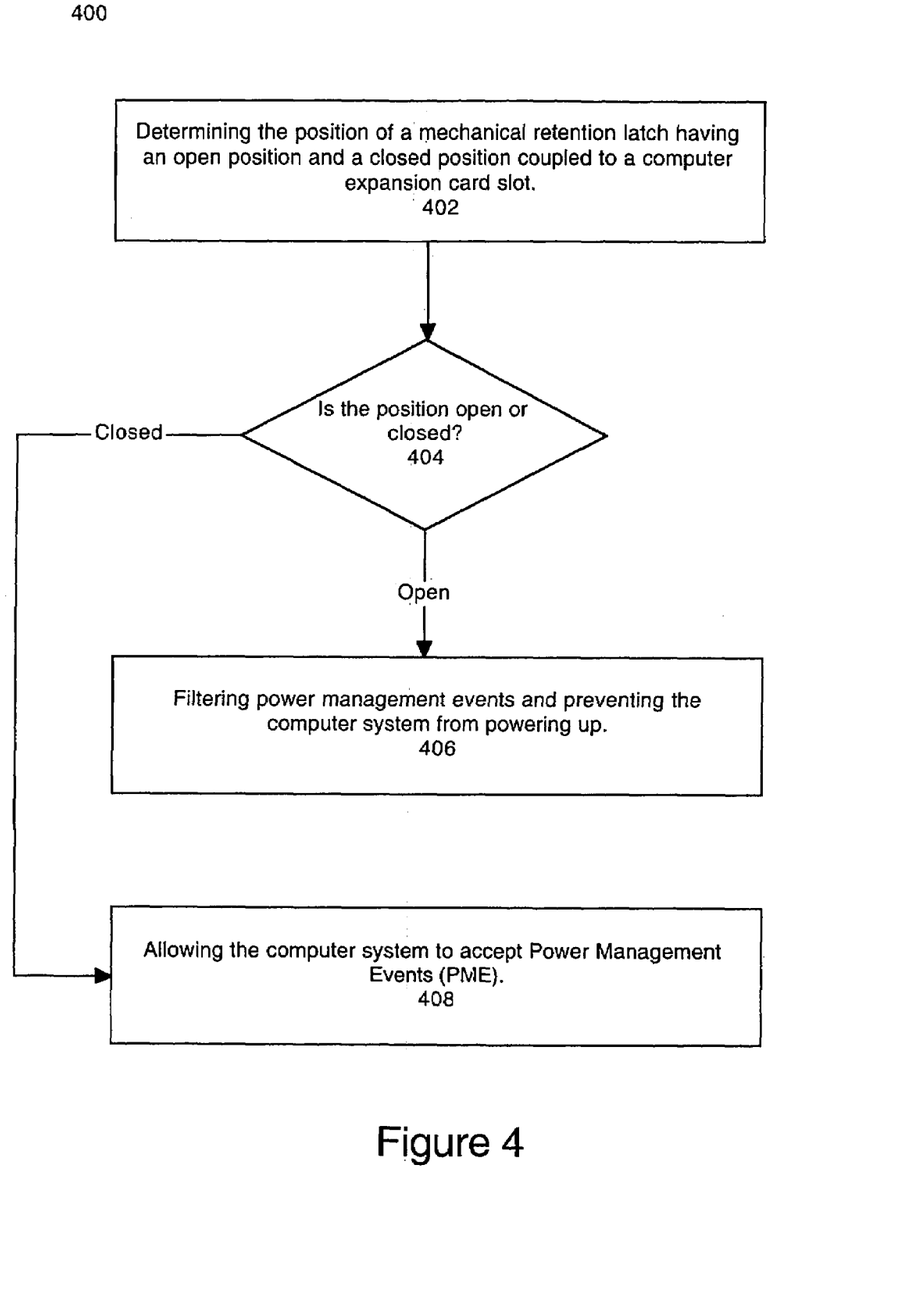
FIG. 4 is a flow diagram of an exemplary process for controlling power in a computer system in accordance with embodiments of the present invention.

FIG. 4 is a data flow diagram of an exemplary process 400 for filtering power management events in accordance with embodiments of the present invention. Process 400 is implemented when the computer system is in a sleep mode and is not currently powered up. The first step 402 is determining the position of a mechanical retention latch having an open position and a closed position coupled to a computer expansion card slot. In one embodiment, data is received from a position sensor indicating either an open position or a closed position. From the data, the position is determined to be open or closed in step 404. If the position is open, process 400 continues with step 406 which is filtering power management events and preventing the computer system from powering up. For example, if the latch is in the open position and the system receives instructions to wake from a sleep mode (e.g., a magic packet), the wake-up event is filtered and the system is prevented from powering up until the latch is closed. If the position is closed, exemplary process 400 continues with step 408 allowing the power management control module to manage events normally, thus allowing the computer system to accept Power Management Events (PME) in sleep mode. For example, if the latch is in the closed position and the system receives instructions to wake from a sleep mode, the system would power up.

In one embodiment of the invention, the computer system comprises a plurality of expansion card slots and a plurality of corresponding mechanical retention latches. In this embodiment of the invention, if any of the plurality of mechanical retention latches is in the open position, power management events are filtered and the computer system is prevented from powering up until the plurality of latches are returned to their closed positions.

Figure 5A:
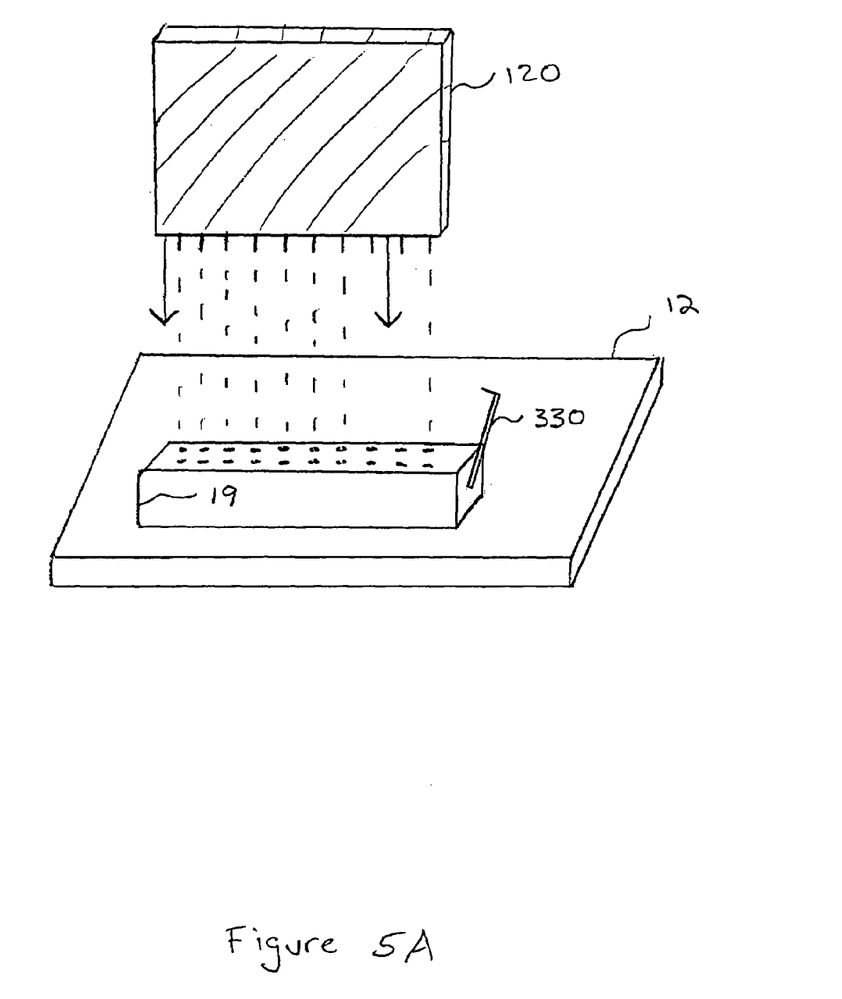
FIG. 5A is an illustration of an exemplary computer expansion card slot configured to provide data to control power management events in accordance with embodiments of the present invention.

FIG. 5A is an illustration of an exemplary expansion card slot for controlling power management events in accordance with embodiments of the present invention. Exemplary expansion card slot 19 is coupled to a computer system 12 as stated above. In accordance with an embodiment of the invention, mechanical retention latch 330 is coupled to the expansion card slot and provides mechanical retention of expansion card (e.g., PCI card) 120. When the expansion card 120 is not fully installed in the expansion card slot 19, the mechanical retention latch 330 is in the open position. While the latch 330 is in the open position, power management events are filtered, preventing the computer system from powering up. In one embodiment of the invention, the latch 330 must be opened from the closed position to install an expansion card (e.g., PCI card 120). Furthermore, the mechanical retention latch 330 is configured to automatically close when the card 120 is fully seated in the card slot 19.

In one embodiment of the invention, the mechanical retention latch automatically goes into the closed position when the PCI card 120 is fully installed in the PCI card slot 19. FIG. 5A illustrates a vertical arrangement of a PCI card and slot wherein the card is fully installed when in the down position. It is appreciated that there are many PCI card slot configurations wherein the fully inserted position may not be in the downward direction. It is also appreciated that multiple PCI card slots may be arranged on computer system 12 wherein a divider separates multiple PCI card slots. In one embodiment of the invention, a divider between multiple PCI card slots comprises a sensor that determines and reports the position of the mechanical retention latch 330.

Figure 5B:
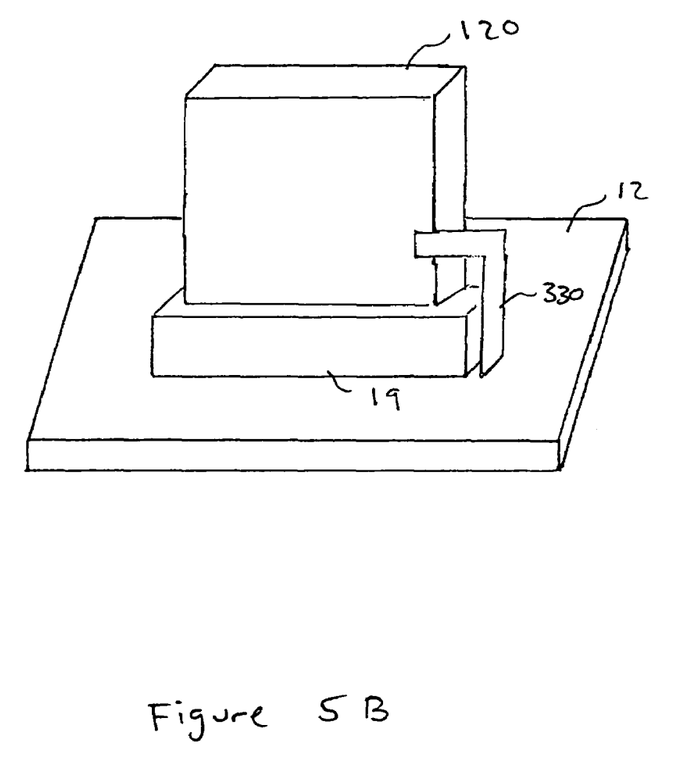
FIG. 5B is an illustration of an exemplary computer expansion card slot with an expansion card installed in accordance with embodiments of the present invention.

FIG. 5B illustrates an expansion card physically installed in a computer expansion card slot in accordance with embodiments of the present invention. After the expansion card 120 is fully installed in the expansion card slot 19, the mechanical retention latch 330 automatically moves to the closed position. Once the latch 330 is in the closed position, power management events are not filtered and the computer system is allowed to accept power management events.

In one embodiment of the invention, the mechanical retention latch 330 hooks to a notch on the PCI card 120 to provide mechanical retention of card 120 in slot 19. In another embodiment of the invention, the mechanical retention latch 330 clips over an end of the card to keep the card 120 in the slot 19. It is appreciated that many configurations of the mechanical retention latch can be used, but in one embodiment of the invention, the latch 330 automatically goes from an open position when a PCI card 120 is fully installed in the slot 19. In this embodiment of the invention, a sensor reports an open position of the latch until the card 120 is fully installed in the slot 19.

Figure 6A:
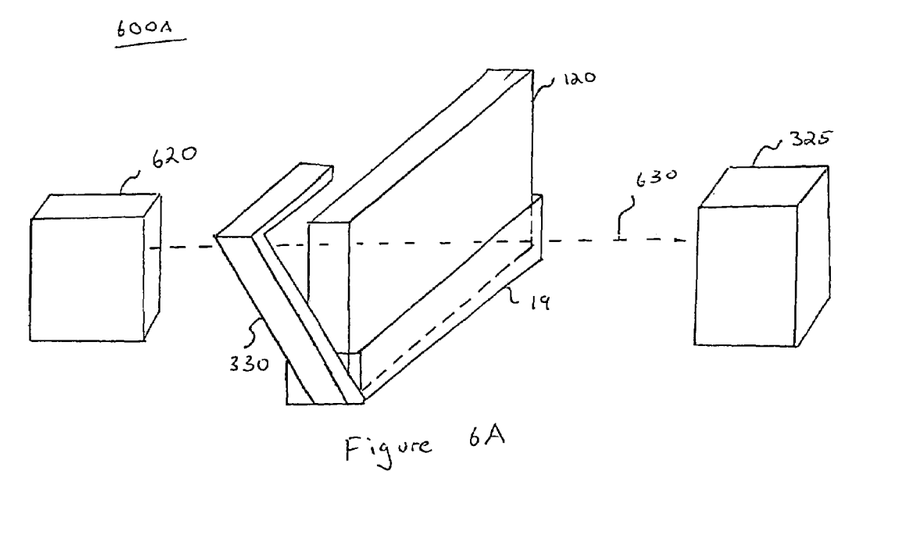
FIG. 6A is an illustration of an exemplary mechanical retention latch in an open position in accordance with embodiments of the present invention.

In one embodiment of the invention, a mechanical retention latch position sensor 325 is used to determine the position of the mechanical retention latch. FIG. 6A illustrates a position sensor 325 that can be used to determine the position of the mechanical retention latch 330 in accordance with embodiments of the present invention. In one embodiment of the invention, an optical device is used to determine whether the mechanical retention latch 330 is in the open position or the closed position. For example, when the mechanical position latch is in the open position 600a, light source 620 produces a light beam 630 that can be received at a position sensor 325. When the mechanical retention latch 330 is in the open position, the light beam 630 is free to traverse the distance between the light source 620 and the position sensor 325 and is unobstructed by the mechanical retention latch 330. FIG. 6A illustrates a PCI card 120 that is not fully inserted in the PCI card slot 19. As a result, the mechanical retention latch 330 is in the open position and therefore the mechanical retention latch position sensor signals an open position to the power management events filter. The system will not be allowed accept Power Management Events (PME) in sleep mode.

It is appreciated that the position of the mechanical retention latch 330 can be determined via many different mechanisms. In one embodiment of the invention, a light beam 630 is used to determine if the mechanical retention latch is open or closed. The natural movements of the mechanical retention latch 330 blocks the light beam 630 from getting to the light sensor 325 when the mechanical retention latch 330 is closed. It is appreciated that the mechanical retention latch 330 automatically closes when an expansion card is fully installed in the expansion card slot and when mechanical retention latch 330 is in the open position, the mechanical retention latch 330 does not block the beam 630 and the sensor 325 detects the light and reports an open condition.

Figure 6B:
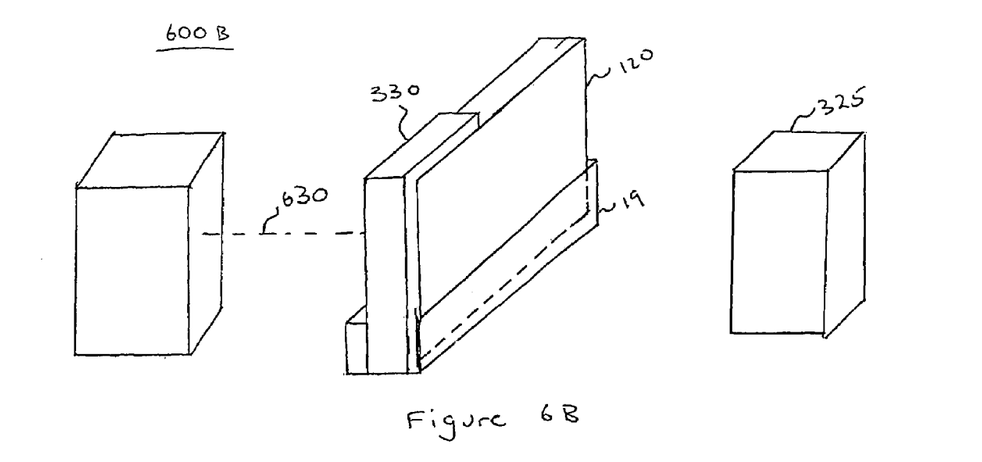
FIG. 6B is an illustration of an exemplary mechanical retention latch in a closed position in accordance with embodiments of the present invention.

FIG. 6B illustrates a mechanical retention latch in a closed position in accordance with an embodiment f the present invention. As stated above, when mechanical retention latch 330 is in the closed position, the light beam 630 is blocked from sensor 325 and the sensor 325 reports data indicating a closed position to the power management events filter 320 from FIG. 3. It is appreciated that the beam could also be blocked in the open position and not blocked in the closed position. The examples of FIGS. 6A and 6B are for illustrative purposes and other alternatives could be used. In one embodiment of the invention, the mechanical retention latch 330 is coupled to a divider between multiple expansion card slots. In this embodiment, a paddle coupled to the mechanical retention latch is used to block a light beam to indicate a closed or open position depending on the orientation of the light source and the paddle.

In an alternate embodiment of the invention, mechanical retention latch 330 comprises an integrated switch that serves to indicate an open or closed position of the mechanical retention latch 330. The switch provides data indicating the position of the latch to the power management events filter 320 of FIG. 3.

Embodiments of the present invention can be implemented on software running on a computer system. The computer system can be a personal computer, notebook computer, server computer, mainframe, networked computer, handheld computer, personal digital assistant, workstation, and the like. This software program is operable for filtering power management events based on the position of a mechanical retention latch for an expansion card slot. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," or "reporting," or "filtering," or "preventing," or "powering," or "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 7:
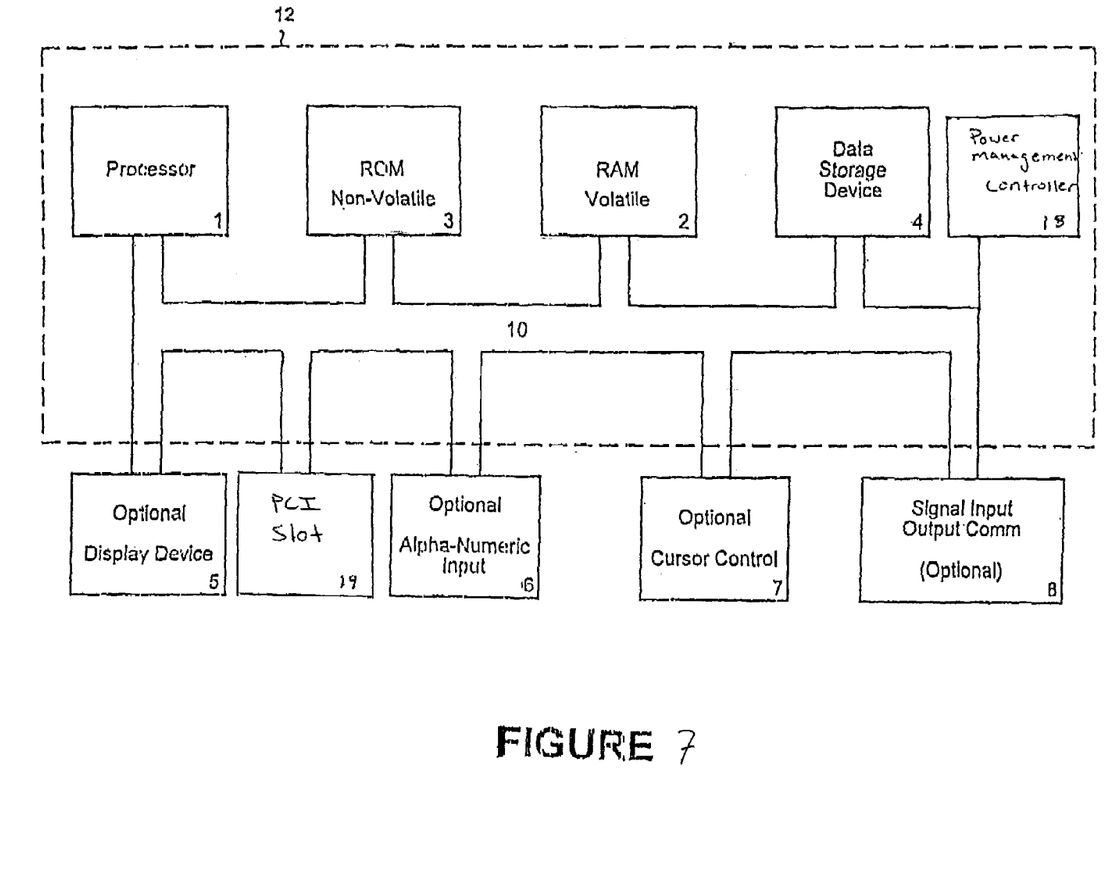
FIG. 7 is a block diagram of an exemplary computer system in accordance with embodiments of the present invention.

Referring now to FIG. 7, a block diagram of exemplary computer system 12 is shown. It is appreciated that computer system 12 of FIG. 7 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer or an embedded computer system such as a mobile telephone or pager system.

Computer system 12 includes an address/data bus 10 for communicating information, a central processor 1 coupled with bus 10 for processing information and instructions, a volatile memory unit 2 (e.g., random access memory, static RAM, dynamic RAM, etc.) coupled with bus 10 for storing information and instructions for central processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. Moreover, computer system 12 also includes a data storage device 4 (e.g., disk drive) for storing information and instructions.

Also included in computer system 12 of FIG. 7 is an optional alphanumeric input device 6. Device 6 can communicate information and command selections to central processor 1. Computer system 12 also includes an optional cursor control or directing device 7 coupled to bus 10 for communicating user input information and command selections to central processor 1. Computer system 12 also includes signal communication interface 8, which is also coupled to bus 10, and can be a serial port. Communication interface 8 can also include number of wireless communication mechanisms such as infrared or a Bluetooth protocol.

Computer system 12 also comprises a peripheral component interface (PCI) slot 19 for receiving a PCI card that expands computing capabilities of computer system 12. In accordance with embodiments of the present invention, a PCI card can be any expansion card that adds functionality to a computer system. For example, the PCI card can be any open architecture industry standard input/output card (I/O card) such as a network interface card (NIC), mass storage cards, sound cards, USB cards, or any other open standard I/O card. Computer system 12 also comprises a power management controller 18 for controlling power management events (PME). For example, one power management event can be waking a computer system from a sleep mode.

Furthermore, it is appreciated that computer system 12 can comprise multiple expansion card slots and multiple mechanical retention latches. In one embodiment of the invention, if any of the mechanical retention latches are in the open position, power management events are filtered for all of the expansion card slots. In other words, if one of the multiple mechanical retention latches is in the open position, the computer system will be prevented from powering up if it were in the sleep mode.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing protected swapping of a peripheral component in a computer system comprising:

determining a position of a first mechanical retention latch, said first mechanical retention latch having an open position and a closed position and configured to communicatively couple to a computer expansion card slot;

provided said first mechanical retention latch is in said open position, ignoring all power management events including preventing said computer system from powering up; and provided said first mechanical retention latch is in said closed position, allowing said computer system to power up wherein said position is determined from said first mechanical retention latch configured to communicatively couple to a peripheral component interconnect slot.

2. The method as recited in claim 1 further comprising:
receiving data from an optical device communicatively coupled to said first mechanical retention latch for determining said position of said first mechanical retention latch.

3. The method as recited in claim 1 further comprising:
powering down said computer system to a sleep mode before determining a position of said first mechanical retention latch.

4. The method as recited in claim 1 further comprising:
hot swapping an expansion card from said expansion card slot and determining said position of said first mechanical retention latch.

5. The method as recited in claim 1 further comprising:
determining a position of a second mechanical retention latch wherein provided said first or said second mechanical retention latch are in said open position, ignoring said power management events.

6. The method as recited in claim 5 wherein said power management events include powering up said computer system from a sleep mode.

7. A system for managing power in a computer system comprising:
a mechanical retention latch coupled to a peripheral component interconnect card slot having an open position and a closed position configured to physically retain an expansion card in an expansion card slot;
a position sensor for determining if said mechanical retention latch is in said open position or in said closed position; and
a power management events filter for ignoring power management events based on said position of said mechanical retention latch wherein if said mechanical retention latch is in said open position, said power management events filter ignores said power management events to prevent powering up said computer system.

8. The system as recited in claim 7 wherein said position sensor comprises an optical module for determining if said mechanical retention latch is in said open position or in said closed position.

9. The system as recited in claim 7 wherein said mechanical retention latch is configured to automatically close when a peripheral component interconnect card is fully inserted in said peripheral component interconnect card slot.

10. The system as recited in claim 7 wherein provided said mechanical retention latch is in said closed position, said power management module allows said computer system to power up.

11. The system as recited in claim 7 further comprising:
a plurality of mechanical retention latches and a plurality of corresponding position sensors configured such that provided one of said plurality of mechanical retention latches is in said open position, said power management events filter ignores said power management events to prevent powering up said computer system.

12. The system as recited in claim 11 wherein said computer system is prevented from powering up from a sleep mode.

13. A computer readable medium comprising executable instructions which, when executed in a processing system, causes the system to perform a method of controlling power management events receiving data corresponding to at least one of a plurality of mechanical retention latches, each having an open position and a closed position; and
provided one of said mechanical retention latches is in said open position, ignoring power management events and preventing said processing system from powering up.

14. The computer readable medium as described in claim 13 wherein said position is determined from said mechanical retention latch configured to communicatively couple to a peripheral component interconnect slot.

15. The computer readable medium as described in claim 13 wherein said data corresponding to said position of said mechanical retention latch is received from an optical device configured to determine said position of said mechanical retention latch.

16. The computer readable medium as described in claim 13 wherein said method is executed while said processing system is in a sleep mode.

17. The computer readable medium as described in claim 13 wherein said method is executed while hot swapping a component of said processing system.

18. The computer readable medium as described in claim 13 wherein said power management events include powering up said computer system from a sleep mode.

* * * * *

UNITED STATES PATENT AND TRADEMARK OFFICE
CERTIFICATE OF CORRECTION

PATENT NO. : 7,234,013 B2
APPLICATION NO. : 10/698900
DATED : June 19, 2007
INVENTOR(S) : Richard Ortiz et al.

It is certified that error appears in the above-identified patent and that said Letters Patent is hereby corrected as shown below:

In column 5, line 20, delete "supercedes" and insert -- supersedes --, therefor.

In column 12, line 12, in Claim 10, delete "power up" and insert -- accept power management events --, therefor.

In column 12, line 26, in Claim 13, after "events" insert -- comprising: --.

Signed and Sealed this

Fifth Day of August, 2008

JON W. DUDAS
*Director of the United States Patent and Trademark Office*